March 23, 1943.   F. E. SETTE   2,314,522

HANDLE STRUCTURE

Original Filed April 12, 1939

INVENTOR
FREDERICK E. SETTE
BY
Wheeler, Wheeler & Wheeler
ATTORNEYS.

Patented Mar. 23, 1943

2,314,522

UNITED STATES PATENT OFFICE 2,314,522

HANDLE STRUCTURE

Frederick E. Sette, Scott Bar, Calif.

Original application April 12, 1939, Serial No. 267,373. Divided and this application May 24, 1941, Serial No. 395,031

2 Claims. (Cl. 16—116)

This invention relates to improvements in handle structures. The present application is a division of my application Serial No. 267,373, filed April 12, 1939, for United States Letters Patent upon Mixers and issued October 29, 1940, as Patent No. 2,243,443.

The primary object of the present invention is to provide a novel and improved handle construction facilitating the assembly of a plastic handle with a support which coacts with the plastic to complete the handle structure.

More specifically it is an object of the invention to provide a skeletonized handle, preferably made of metal, and unfinished in itself to which a plastic sheath is frictionally applicable in a manner requiring no adhesives or mechanical attaching devices for security of connection under normal usage.

It is a further object of the invention to provide a handle structure comprising two parts, each of which may be molded and which have complementary portions frictionally engageable to retain the parts assembled without other means of connection.

In the drawing.

Like parts are identified by the same reference characters throughout the several views.

Figure 1:
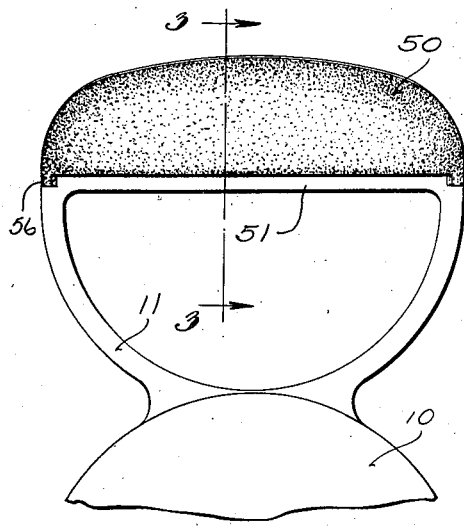
Fig. 1 is a side elevation of a handle structure embodying the invention, a tool or implement with which the handle is used being fragmentarily illustrated.

The tool or implement 10, which may comprise a beater or mixer such as is disclosed in the companion application above identified, carries a D-frame 11 which constitutes a part of my improved handle in its preferred form. The outwardly curving sides of the frame 11 are integrally joined by a cross bar 51, the D-frame preferably being of a construction adapted to be made by die casting or some other form of molding.

Upstanding on the upper surface of the cross bar 51 are the lugs 52 which preferably correspond in width to the bar 51 and are made to receive with a friction fit the pins 53 of the separately molded hand-grip element 50.

Figure 3:
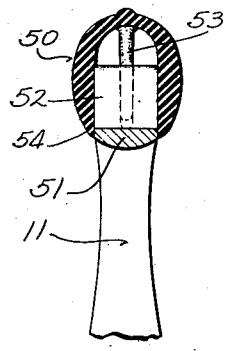
Fig. 3 is a fragmentary detail view taken in cross section on the line 3—3 of Fig. 1.
Figure 4:
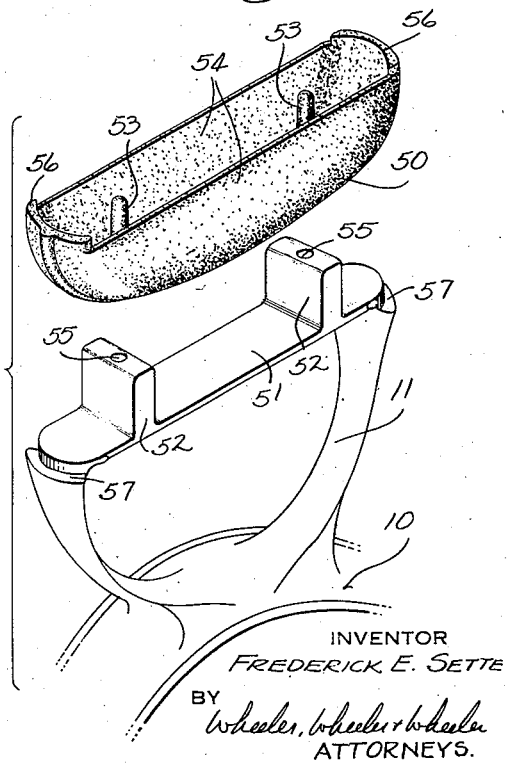
Fig. 4 is a view showing in perspective the complementary parts separately molded and frictionally adherent to constitute the completed handle of the present invention, the upper molded part being shown inverted.

The grip element 50 is molded in one piece to comprise sides 54 which are externally convex, as shown in Fig. 3, and are internally planiform to fit against the exposed surfaces of the rectangular lugs 52 and marginally straight to engage the sides of bar 51. The pins 53 are preferably integral with element 50 and project downwardly from its upper surface at the points suitable for registration with the holes 55 in lugs 52.

Figure 2:
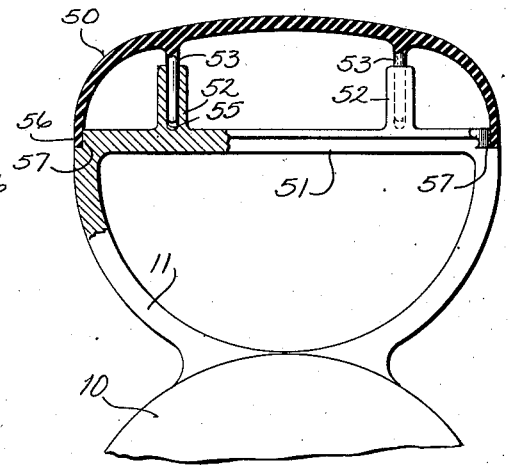
Fig. 2 is a view similar to Fig. 1 with portions of the handle structure successively broken away to different sections to expose the interior construction.

The handle element 50 is also convex in longitudinal section, as shown in Fig. 2, and is preferably provided at its ends with skirt portions 56 which are complementary to shoulders 57 formed upon the D-frame 11 at each end of the cross bar 51 thereof.

While the D-frame portion of the handle is usually made by die casting of any suitable alloy or metal and the handle element 50 is usually molded from a plastic composition, it will be apparent that the invention is not limited to the use of any particular materials. The driving fit of pins 53 in holes 55 of lugs 52 is precluded from loosening by the fact that the cap element 50 of the handle receives support laterally from the lugs 55 and from the side of the cross bar 51 of the D-frame and also from the shoulders 57 at the ends of such cross bar so that the cap element 50 is positively precluded from lateral movement in any direction with respect to the D-frame.

The D-frame provides the structural strength in the device as disclosed, while the cap element 50, preferably of plastic material, provides a smoothly rounded grip which is completed by the convexity of the under surface of the D-frame cross bar 51, as best shown in Fig. 3.

I claim:

1. A handle comprising the combination with a D-frame having a transverse bar and a pair of lugs corresponding in width to the bar and upstanding in spaced relation to each other intermediate the ends of the bar, each of said lugs being socketed, of a cap element comprising a hollow inverted channel marginally engaged with the sides of the bar and engaged with said D-frame adjacent the end of the bar, said channel being centrally provided with downwardly depending pins respectively engaged in the sockets of said lugs, the inner surface of the cap element laterally engaging said lugs.

2. In an implement handle, the combination with a metallic D-frame comprising a bar, of socketed lugs upstanding from said bar in spaced relation longitudinally thereof, said lugs extending transversely of the bar, and a hollow inverted channel-shaped plastic cap element provided with skirt portions fitted marginally to the sides and ends of the bar and to the sides of the respective lugs, said cap element having a pair of integral pins longitudinally spaced in the interior of the cap element to register with the sockets of said lugs, said pins providing friction surfaces in driven fit engagement with said lugs whereby the frictional connection between the respective pins and lugs provides the sole connection between the cap element and bar, the exterior surfaces of the cap element and bar being formed to merge and together to constitute a handle.

FREDERICK E. SETTE.